US012771076B2

(12) United States Patent
Yeo et al.

(10) Patent No.: US 12,771,076 B2
(45) Date of Patent: Oct. 20, 2026

(54) ELECTRICAL CONNECTOR CONNECTING TO WIRES COMPRISING SHIELD STRUCTURE

(71) Applicant: Tyco Electronics AMP Korea Co., Ltd., Gyeongsan (KR)

(72) Inventors: Jin Hwan Yeo, Gyeongsan-si (KR); Young-Geun Park, Gyeongsan-si (KR); Suk Ho Jang, Gyeongsan-si (KR)

(73) Assignee: TYCO ELECTRONICS AMP KOREA CO., LTD., Gyeongsan (KR)

( * ) Notice: Subject to any disclaimer, the term of this patent is extended or adjusted under 35 U.S.C. 154(b) by 365 days.

(21) Appl. No.: 18/490,005

(22) Filed: Oct. 19, 2023

(65) Prior Publication Data

US 2024/0136771 A1 Apr. 25, 2024
US 2024/0235123 A9 Jul. 11, 2024

(30) Foreign Application Priority Data

Oct. 19, 2022 (KR) ........................ 10-2022-0135023
Sep. 20, 2023 (KR) ........................ 10-2023-0125631

(51) Int. Cl.
*H01R 13/6581* (2011.01)
*H01R 13/502* (2006.01)
(Continued)

(52) U.S. Cl.
CPC ....... *H01R 13/6581* (2013.01); *H01R 13/502* (2013.01); *H01R 13/506* (2013.01);
(Continued)

(58) Field of Classification Search
CPC ......................... H01R 13/6581; H01R 13/502; H01R 13/506; H01R 13/5804; H01R 13/5812;
(Continued)

(56) References Cited

U.S. PATENT DOCUMENTS

2019/0221330 A1* 7/2019 Fuehrer .................. H01B 7/423
2020/0185850 A1* 6/2020 Zhao ...................... H01R 13/20

FOREIGN PATENT DOCUMENTS

EP 3869632 A1 * 8/2021 .............. B60L 53/18
WO 2021241147 A1 12/2021

OTHER PUBLICATIONS

Extended European Search Report dated Mar. 12, 2024, corresponding to Application No. 23204477.6-1201, 9 pages.

* cited by examiner

*Primary Examiner* — Justin M Kratt

(57) ABSTRACT

A connector having a shield structure includes a housing, an outer case connected to the housing, an inner case disposed between the housing and the outer case, and a shield structure surrounding the inner case. The connector includes a first cable having a first line, a first inner cover surrounding the first line, and a first cable shield surrounding the first inner cover and connected to the shield structure. The connector includes a second cable having a second line, a second inner cover surrounding the second line, and a second cable shield surrounding the second inner cover and connected to the shield structure. The connector includes a ground terminal electrically connecting the first cable shield and the second cable shield to a first ground, and a ground cable connected to the ground terminal and electrically connecting the first cable shield and the second cable shield to a second ground.

20 Claims, 14 Drawing Sheets

(51) Int. Cl.

| | |
|---|---|
| ***H01R 13/506*** | (2006.01) |
| ***H01R 13/58*** | (2006.01) |
| ***H01R 13/6593*** | (2011.01) |
| ***H01R 13/6597*** | (2011.01) |
| *B60L 53/18* | (2019.01) |
| *H01R 9/05* | (2006.01) |
| *H01R 13/6585* | (2011.01) |
| *H01R 13/6589* | (2011.01) |
| *H01R 13/6591* | (2011.01) |

(52) U.S. Cl.

CPC ..... *H01R 13/5804* (2013.01); *H01R 13/5812* (2013.01); *H01R 13/6593* (2013.01); *H01R 13/6597* (2013.01); *B60L 53/18* (2019.02); *H01R 9/0512* (2013.01); *H01R 9/0518* (2013.01); *H01R 13/5816* (2013.01); *H01R 13/6585* (2013.01); *H01R 13/6589* (2013.01); *H01R 13/6591* (2013.01); *H01R 13/65912* (2020.08); *H01R 13/65914* (2020.08); *H01R 13/65917* (2020.08)

(58) Field of Classification Search

CPC ............ H01R 13/6593; H01R 13/6597; H01R 9/0512; H01R 9/0518; H01R 13/5816; H01R 13/6585; H01R 13/6589; H01R 13/6591; H01R 13/65912; H01R 13/65914; H01R 13/65917; B60L 53/18

See application file for complete search history.

ELECTRICAL CONNECTOR CONNECTING TO WIRES COMPRISING SHIELD STRUCTURE

CROSS-REFERENCE TO RELATED APPLICATION

This application claims the benefit of the filing date under 35 U.S.C. § 119(a)-(d) of Korean Patent Application No. 10-2022-0135023, filed on Oct. 19, 2022, and Korean Patent Application No. 10-2023-0125631, filed on Sep. 20, 2023, in the Korean Intellectual Property Office.

FIELD OF THE INVENTION

The present disclosure relates to a connector having a shield structure.

BACKGROUND

A connector is a type of component that selectively allows or disallows electrical connection. For example, an automobile is provided with many electrical components such as electronic components or sensors, and these electrical components are electrically connected to other electrical components or a power supply through connectors.

SUMMARY

A connector having a shield structure includes a housing, an outer case connected to the housing, an inner case disposed between the housing and the outer case, and a shield structure surrounding the inner case. The connector includes a first cable having a first line, a first inner cover surrounding the first line, and a first cable shield surrounding the first inner cover and connected to the shield structure. The connector includes a second cable having a second line, a second inner cover surrounding the second line, and a second cable shield surrounding the second inner cover and connected to the shield structure. The connector includes a ground terminal electrically connecting the first cable shield and the second cable shield to a first ground, and a ground cable connected to the ground terminal and electrically connecting the first cable shield and the second cable shield to a second ground.

BRIEF DESCRIPTION OF THE DRAWINGS

Features and advantages of the present disclosure will become apparent and more readily appreciated from the following description of embodiments, taken in conjunction with the accompanying drawings of which.

DETAILED DESCRIPTION OF THE EMBODIMENTS

Figure 1:
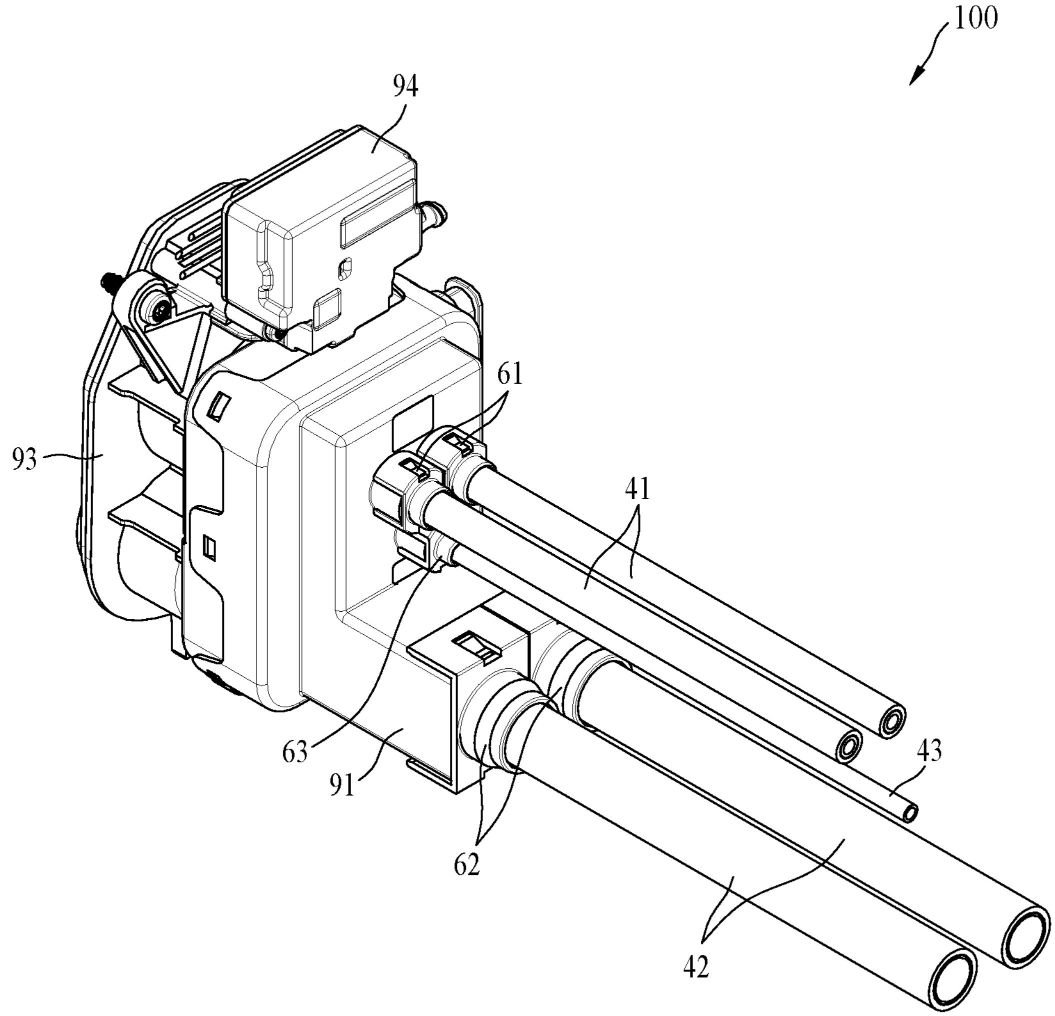
FIG. 1 is a perspective view of a connector according to an embodiment.

Hereinafter, embodiments are described in detail with reference to the accompanying drawings. The following description describes one of several aspects of the embodiments, and the following description forms part of the detailed description of the embodiments. In the description of an embodiment, any detailed description of a well-known function or configuration is not included to clearly convey the gist of the present disclosure.

However, various alterations and modifications may be made to the embodiments. Thus, the embodiments are not meant to be limited by the descriptions of the present disclosure. The embodiments should be understood to include all changes, equivalents, and replacements within the idea and the technical scope of the disclosure.

In addition, the terms or words used to describe the present disclosure and claims should not be construed in a conventional or dictionary meaning, and based on a principle that the inventor may properly define the concept of terms in order to best describe their invention, the terms or words should be construed as having meanings and concepts consistent with the technical idea of the disclosure according to an embodiment.

The singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which the embodiments belong. Terms defined in dictionaries generally used should be construed as having meanings matching contextual meanings in the related art and are not to be construed as having an ideal or excessively formal meaning unless otherwise defined herein.

When describing the embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

The constituent element, which has the same common function as the constituent element included in any one embodiment, will be described by using the same name in other embodiments. Unless disclosed to the contrary, the configuration disclosed in any one embodiment may be applied to other embodiments, and the specific description of the repeated configuration will be omitted.

Figure 2:
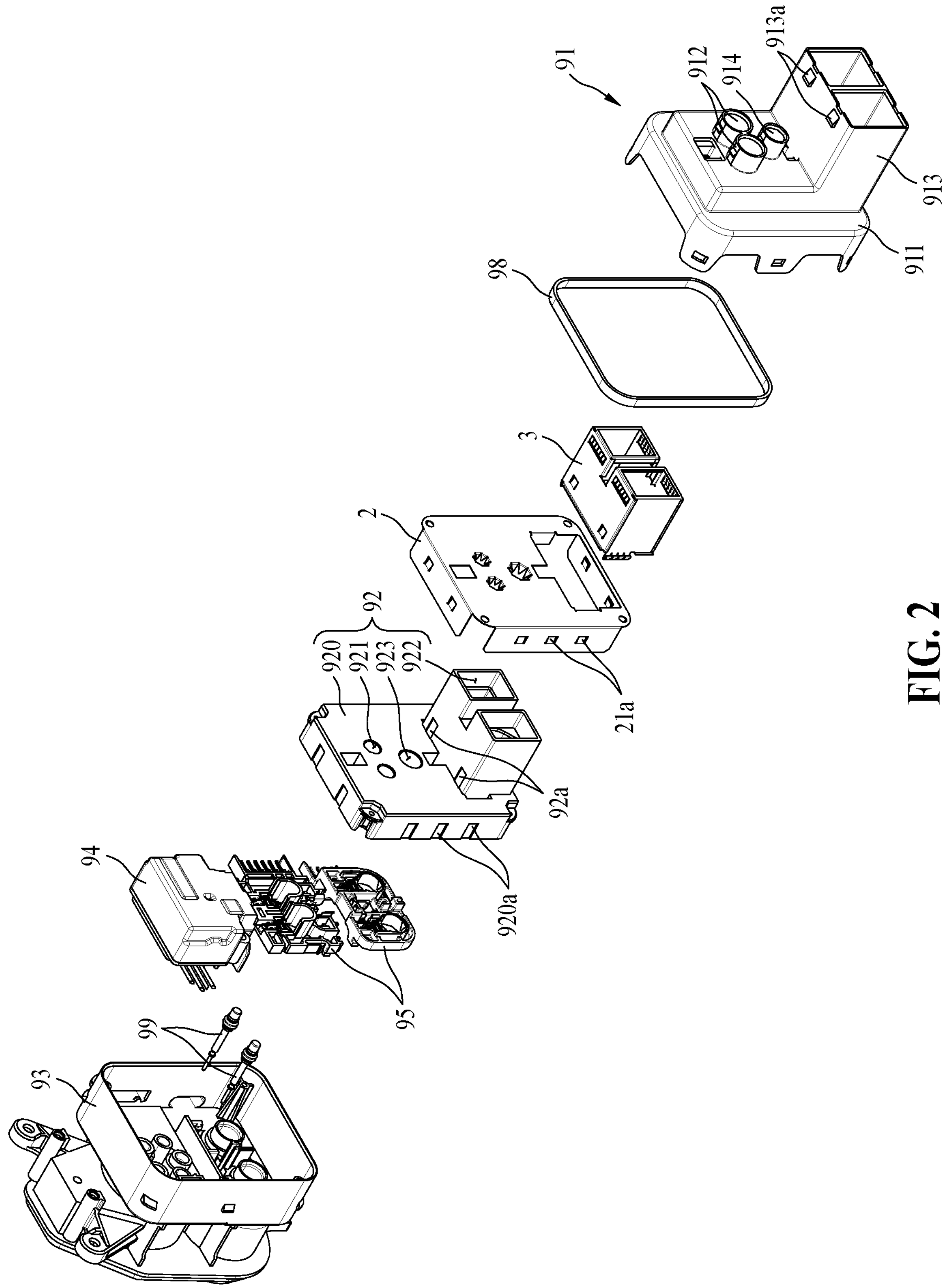
FIG. 2 is an exploded perspective view of a connector according to an embodiment.
Figure 3:
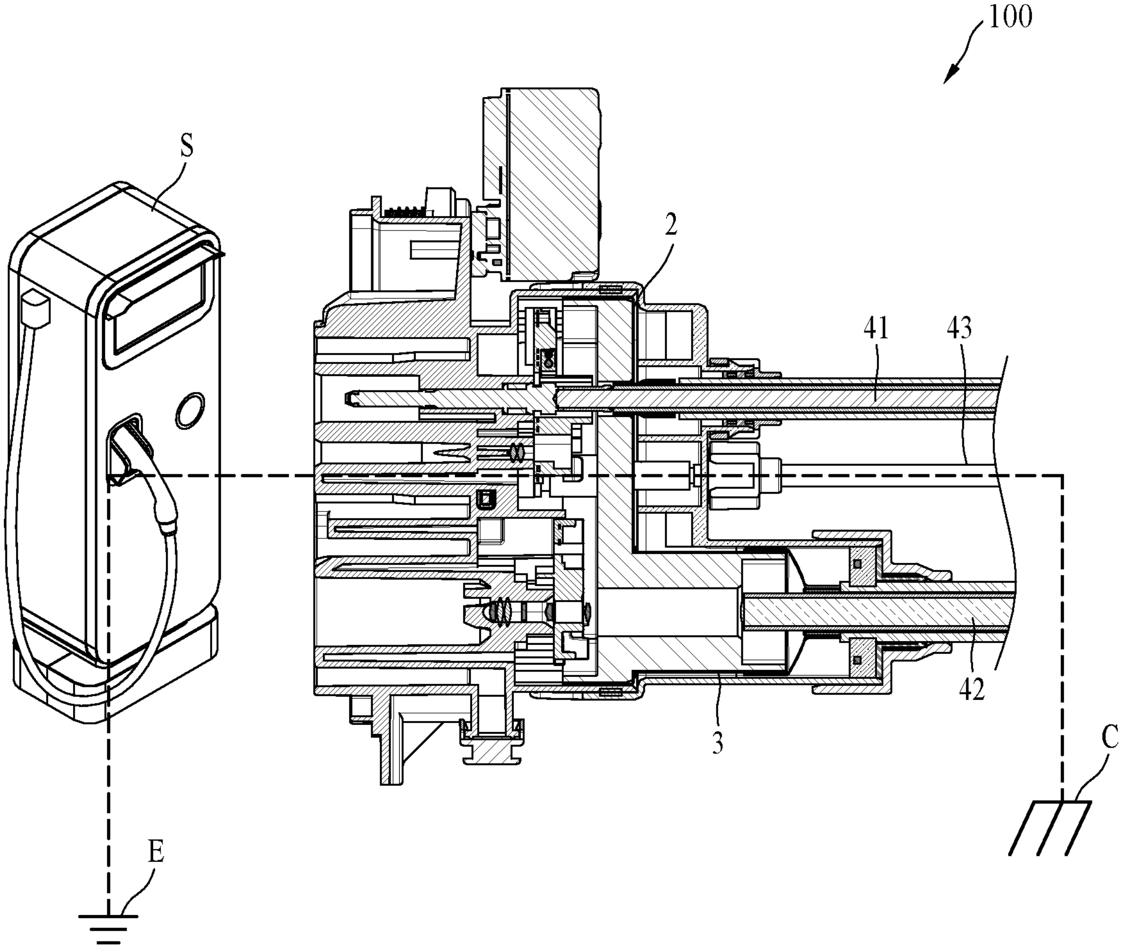
FIG. 3 is a view schematically illustrating a shield structure of a connector electrically connected to an earth ground and a chassis ground according to an embodiment.

Referring to FIGS. 1 to 3, a connector 100 having a shield structure (hereinafter, referred to as the connector) may shield a plurality of cables. Here, shielding refers to blocking noise so that signals may be transmitted stably. The connector 100 may simultaneously shield the plurality of cables. The plurality of cables may include different types of cables. A portion of the plurality of cables may transmit alternating current (AC), and the other portion thereof may transmit direct current (DC). Any one of the plurality of cables may be connected to a ground. Respective shield portions of the plurality of cables may be electrically connected to each other and electrically to the ground.

The connector 100, as shown in FIGS. 1 and 2, may include an outer case 91, an inner case 92, a housing 93, an outer electronic component 94, an inner electronic component 95, an O-ring 98, a first terminal 99, a shield shell base 2, a shield shell body 3, a first cable 41, a second cable 42, a ground cable 43, a first cable clamp 61, a second cable clamp 62, and a ground cable clamp 63. The inner case 92 may include a case groove 92*a* recessed from the surface thereof.

The outer case 91 may form a portion of the exterior of the connector 100. The outer case 91 may include a fixing portion to which a plurality of clamps 61, 62, and 63 are fixed. The outer case 91, as shown in FIG. 2, may include an outer case body 911, a first cable accommodating part 912, a second cable accommodating part 913, and a ground terminal accommodating part 914. The outer case body 911 may be detachably coupled to the housing 93. The outer case body 911 may be detachable from the housing 93. The first cable accommodating part 912 may protrude from the outer case body 911. The first cable accommodating part 912 may include a hole for accommodating the first cable 41. The second cable accommodating part 913 may protrude from the outer case body 911. The second cable accommodating part 913 may include a hole for accommodating the second cable 42. The respective holes in the first cable accommodating part 912 and the second cable accommodating part 913 may be different in size. For example, the size of the hole in the second cable accommodating part 913 may be larger than the size of the hole in the first cable accommodating part 912. The ground cable accommodating part 914 may protrude from the outer case body 911. The ground cable accommodating part 914 may accommodate the ground cable 43. The second cable accommodating part 913 may include a protrusion 913*a*.

The inner case 92 may be provided between the outer case 91 and the housing 93. The inner case 92 may include a hollow for accommodating the plurality of electronic components 94 and 95. The inner case 92 may include an inner case body 920, a first case hole 921, a second case hole 922, and a ground case hole 923, as shown in FIG. 2. The inner case body 920 may support the shield shell base 2. The inner case body 920 may include a groove 920*a* for supporting an arm 21*a* of the shield shell base 2. The arm 21*a* will be described in detail later. The arm 21*a* may be referred to as a first base frame arm. The arm 21*a* of the shield shell base 2 may be connected in close contact with the groove of the inner case body 920. The first case hole 921 may be formed through the inner case body 920. The first case hole 921 may communicate with the hole in the first cable accommodating part 912. The second case hole 922 may be formed through the inner case body 920. The second case hole 922 may communicate with the hole in the second cable accommodating part 911. The ground case hole 923 may be formed through the inner case body 920. The ground case hole 923 may communicate with the hole in the ground cable accommodating part 914.

The housing 93 may accommodate the inner case 92 and be connected to the outer case 91. The housing 93 may be connected to a charging station, for example.

The outer electronic component 94 may be connected to the housing 93.

The inner electronic component 95 may be provided in an accommodation space between the inner case 92 and the housing 93.

The O-Ring 98 may be provided inside the outer case 91. The O-ring 98 may reduce or block the unintentional introduction of water or foreign substances from the outside into the outer case 91.

The first terminal 99 may be connected to the first cable 41.

The shield shell base 2 may surround at least a portion of the inner case 92. The shield shell base 2 may include a plurality of holes that overlap the hole in the first cable accommodating part 912 and the hole in the ground cable accommodating part 914.

The shield shell body 3 may be connected to the shield shell base 2. The shield shell body 3 may be surrounded by the second cable accommodating part 913. It should be noted that in this specification, the shield shell base 2 and the shield shell body 3 may be referred to as a shield structure.

The first cable 41 may transmit AC. The first cable 41 may include a cable shield. The cable shield of the first cable 41 may be connected to the shield shell base 2. A plurality of first cables 41 may be provided.

The second cable 42 may transmit DC. The second cable 42 may include a cable shield. The cable shield of the second cable 42 may be connected to the shield shell body 3. The cable shield of the second cable 42 may be electrically connected to the cable shield of the first cable 41 through the shield shell base 2 and the shield shell body 3.

The ground cable 43 may be connected to the ground. The ground cable 43 may electrically connect the cable shield of the first cable 41 and the cable shield of the second cable 42 through the shield shell base 2 and the shield shell body 3.

The shield shell base 2 and the shield shell body 3 may be electrically and physically connected to each other. Through the shield structure, the AC power cable and the DC power cable may be shielded at the same time.

The first cable clamp 61 may secure the first cable 41 to the outer case 91, as shown in FIG. 1. The first cable clamp 61 may be provided to be fixed to the first cable 41 and detachable from the outer case 91. The first cable clamp 61 may be connected to the first cable accommodating part 912. The first cable clamp 61 may include an arm structure that may elastically deform and may be caught by the first cable accommodating part 912.

The second cable clamp 62 may secure the second cable 42 to the outer case 91, as shown in FIG. 1. The second cable clamp 62 may be provided to be fixed to the second cable 42 and detachable from the outer case 91. The second cable clamp 62 may be connected to the second cable accommodating part 913. The second cable clamp 62 may include an arm structure that may elastically deform and may be caught by the second cable accommodating part 913.

The ground cable clamp 63 may secure the ground cable 43 to the outer case 91, as shown in FIG. 1. The ground cable clamp 63 may be provided to be fixed to the ground cable 43 and detachable from the outer case 91. The ground cable clamp 63 may be connected to the ground cable accommodating part 914. The ground cable clamp 63 may include an arm structure that may elastically deform and may be caught by the ground cable accommodating part 914.

The connector 100 may electrically connect the first cable 41, the second cable 42, and the ground cable 43 through the shield shell base 2 and the shield shell body 3, as shown in FIGS. 1 and 3. The connector 100 may connect the shield of each of the first cable 41, the second cable 42, and the ground cable 43 to the ground through the ground cable 43 connected to a plurality of grounds C and E. The connector 100 may be connected to the charging station S. The plurality of grounds C and E may include a chassis ground C, for example in a vehicle, and an earth ground E.

Figure 4:
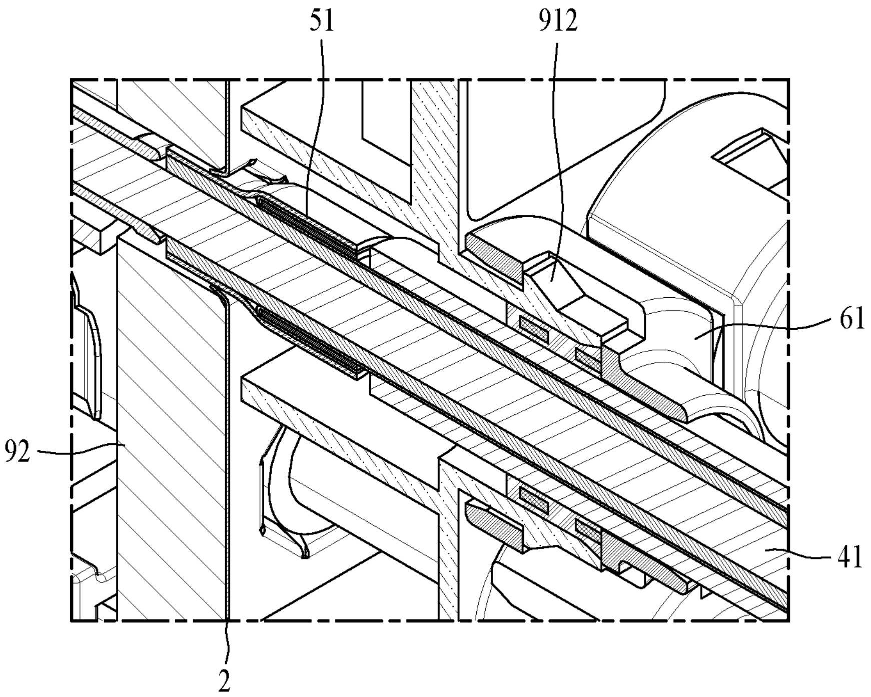
FIG. 4 is an enlarged cross-sectional perspective view of a portion of a connector according to an embodiment.
Figure 5:
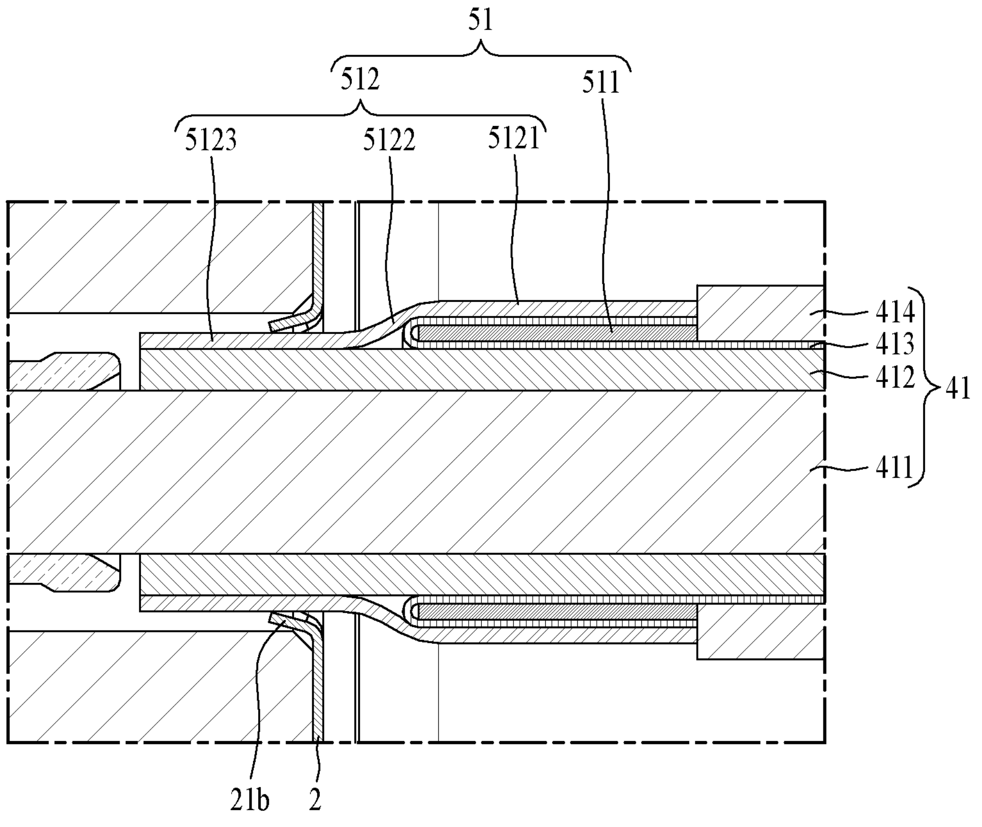
FIG. 5 is an enlarged cross-sectional view of a portion of a connector according to an embodiment.

As shown in FIGS. 4 and 5, the first cable 41 may be connected to the first cable accommodating part 912 through the first cable clamp 61. For example, the first cable clamp 61 may be attached to the first cable 41. The first cable clamp 61 may be detachable from the first cable accommodating part 912. The first cable clamp 61 may include a hole for accommodating at least a portion of the first cable accommodating part 912. At least a portion of the first cable accommodating part 912 may have a protrusion.

As shown in FIG. 5, the first cable 41 may include a first line 411 for transmitting AC, a first inner cover 412 surrounding the first line 411, a first cable shield 413 provided to surround the first inner cover 412 and block noise, and a first outer cover 414 surrounding the first cable shield 413. An end portion of the first cable shield 413 may have a shape rolled outward. The end portion of the first cable shield 413 may have a U-shaped cross section. A first inner ferrule 511, which will be described later, may be inserted into the end portion of the first cable shield 413.

A first ferrule 51 may be connected to the first cable 41 and may connect the shield of the first cable 41 to the shield shell base 2, as shown in FIG. 5. The first ferrule 51 may be physically and electrically connected to the shield shell base 2. The shield shell base 2 may surround the inner case 92. The first ferrule 51 may include the first inner ferrule 511 and a first outer ferrule 512. The first ferrule 51 may be connected to a second base frame arm 21*b*. The second base frame arm 21*b* will be described later.

The first inner ferrule 511 may be connected to the first cable shield 413, as shown in FIG. 5. The first inner ferrule 511 may have a ring shape. At least two surfaces of the first inner ferrule 511 may be provided in contact with the first cable shield 413.

The first outer ferrule 512 may surround the first inner ferrule 511 and may be connected to the shield shell base 2 and the first cable shield 413. The first outer ferrule 512 may include a first outer ferrule base 5121 with an inner surface connected to the first cable shield 413, a first outer ferrule head 5123 with an outer surface connected to the shield shell base 2 and an inner surface connected to the first inner cover 412, and a first outer ferrule body 5122 connecting the first outer ferrule base 5121 and the first outer ferrule head 5123. The first outer ferrule body 5122 may include an inclined surface. The first outer ferrule body 5122 may have a shape that gradually narrows from the first outer ferrule base 5121 toward the first outer ferrule head 5123.

Figure 6:
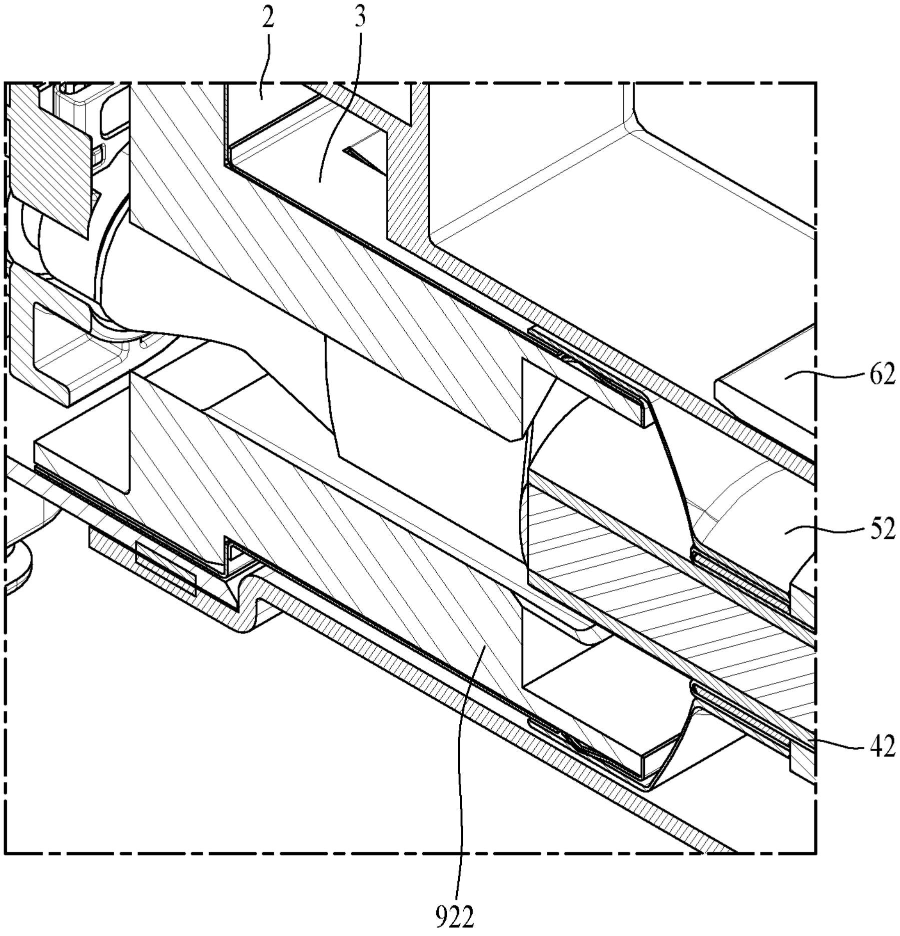
FIG. 6 is an enlarged cross-sectional perspective view of a portion of a connector according to an embodiment.
Figure 7:
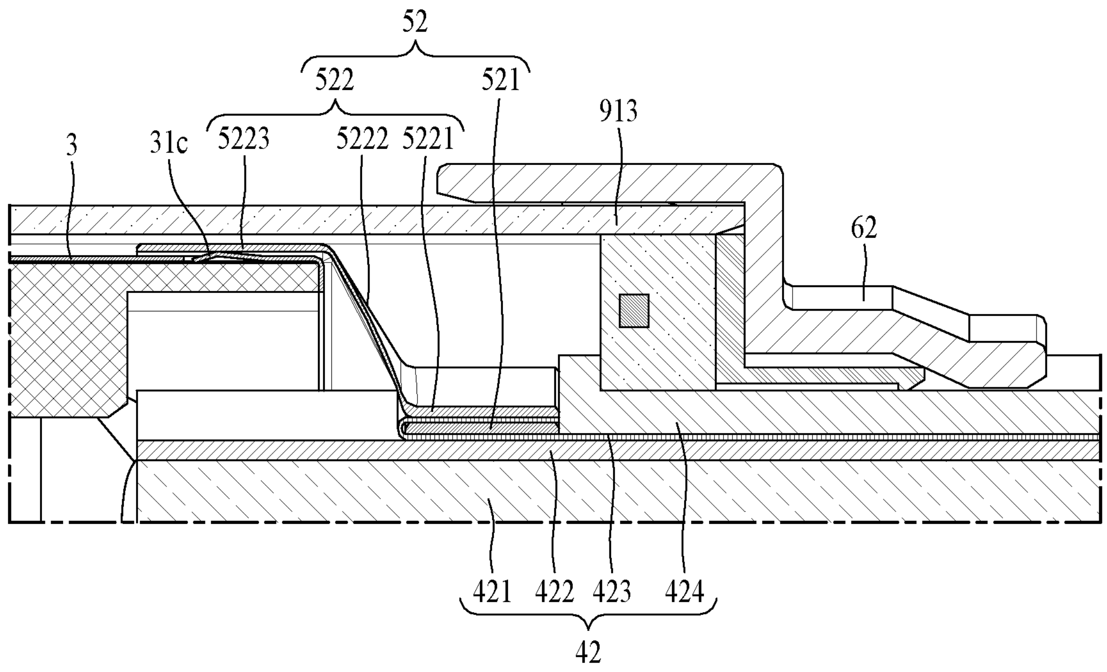
FIG. 7 is an enlarged cross-sectional view of a portion of a connector according to an embodiment.

As shown in FIGS. 6 and 7, the second cable 42 may be connected to the second cable accommodating part 913 through the second cable clamp 62. For example, the second cable clamp 62 may be attached to the second cable 42. The second cable clamp 62 may be detachable from the second cable accommodating part 913. The second cable clamp 62 may include a hole for accommodating at least a portion of the second cable accommodating part 913. At least a portion of the second cable accommodating part 913 may have the protrusion 913*a* (see FIG. 2).

The second cable 42 may include a second line 421 for transmitting DC, a second inner cover 422 surrounding the second line 421, a second cable shield 423 provided to surround the second inner cover 422 and block noise, and a second outer cover 424 surrounding the second cable shield 423, as shown in FIG. 7. The second line 421 may be formed to be larger than the first line 411. The second line 421 may transmit current of a relatively high intensity compared to the first line 411. An end portion of the second cable shield 423 may have a shape rolled outward. The end portion of the second cable shield 423 may have a U-shaped cross section. A second inner ferrule 521, which will be described later, may be inserted into the end portion of the second cable shield 423.

A second ferrule 52 may be connected to the second cable 42 and may connect the shield of the second cable 42 to the shield shell body 3. The second ferrule 52 may be physically and electrically connected to the shield shell body 3. The second ferrule 52 may include a second inner ferrule 521 and a second outer ferrule 522. The second ferrule 52 may be in contact with a third body frame arm 31*c* provided on the shield shell body 3. The third body frame arm 31*c* will be described later.

The second inner ferrule 521 may be connected to the second cable shield 423. The second inner ferrule 521 may have a ring shape. At least two surfaces of the second inner ferrule 521 may be provided in contact with the second cable shield 423.

The second outer ferrule 522 may surround the second inner ferrule 521 and may be connected to the shield shell body 3 and the second cable shield 423, as shown in FIG. 7. The second outer ferrule 522 may include a second outer ferrule base 5221 with an inner surface connected to the second cable shield 423, a second outer ferrule head 5223 with an inner surface connected to the shield shell body 3, and a second outer ferrule body 5222 connecting the second outer ferrule base 5221 and the second outer ferrule head 5223. The second outer ferrule body 5222 may include an inclined surface. The second outer ferrule body 5222 may have a shape that gradually narrows from the second outer ferrule base 5221 toward the second outer ferrule head 5223.

Figure 8:
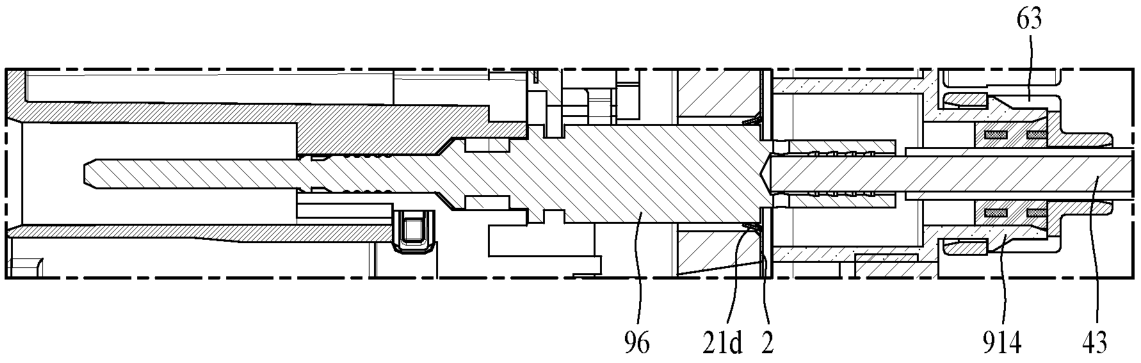
FIG. 8 is an enlarged cross-sectional perspective view of a portion of a connector according to an embodiment.

As shown in FIG. 8, the ground cable 43 may be connected to the ground cable accommodating part 914 through the ground cable clamp 63. For example, the ground cable clamp 63 may be attached to the ground cable 43. An end portion of the ground cable 43 may be accommodated in the ground terminal 96. The ground terminal 96 may be provided in contact with the shield shell base 2. The ground terminal 96 may be connected to a fourth base frame arm 21*d*. The fourth base frame arm 21*d* will be described later.

Figure 9:
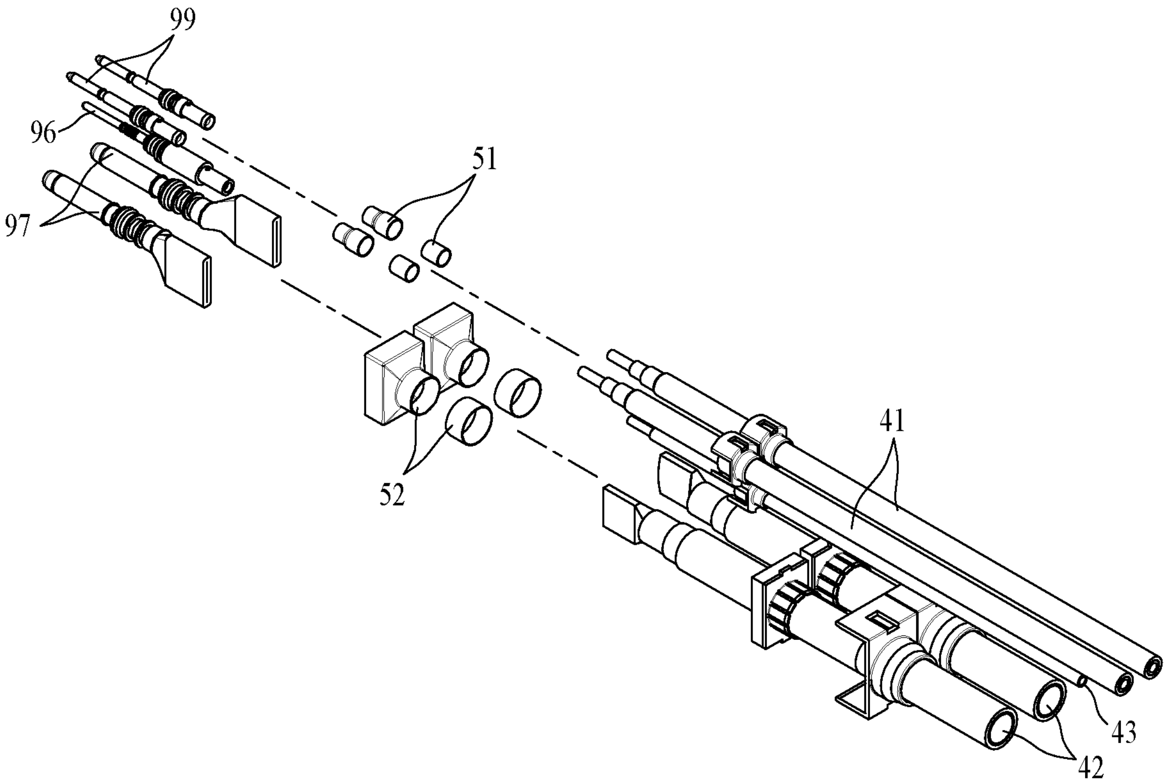
FIG. 9 is an exploded perspective view schematically illustrating a plurality of cables and lines according to an embodiment.

As shown in FIG. 9, the first cable 41 may be connected to the shield structure through the first ferrule 51. The first cable 41 may be connected to the first terminal 99. The first terminal 99 may be connected to the housing (see FIG. 1). The second cable 42 may be connected to the shield structure through the second ferrule 52. The second cable 42 may be connected to the second terminal 97. The second terminal 97 may be connected to the housing (see FIG. 1). The ground cable 43 may be connected to the ground terminal 96.

Figure 10:
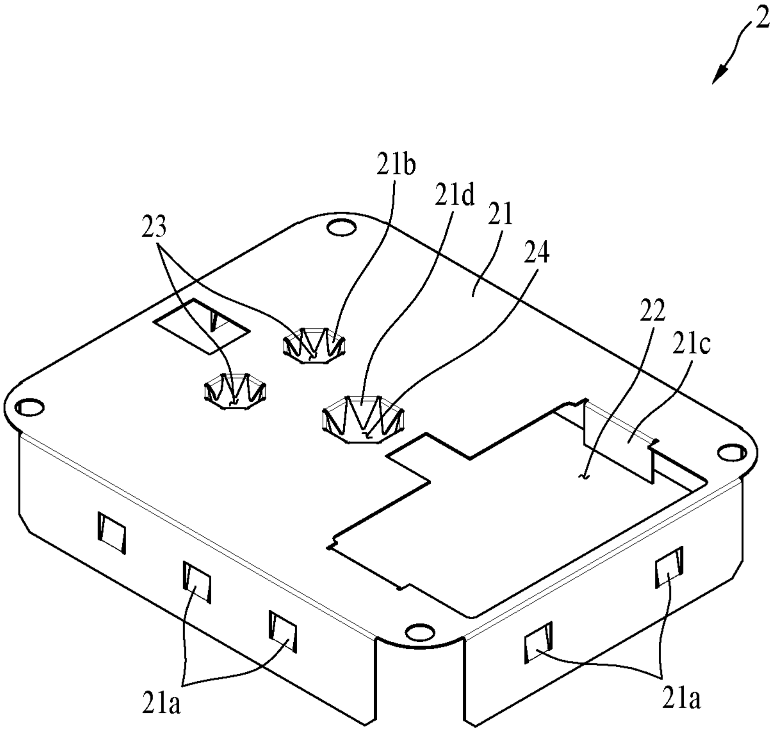
FIG. 10 is a perspective view of a shield shell base according to an embodiment.
Figure 11:
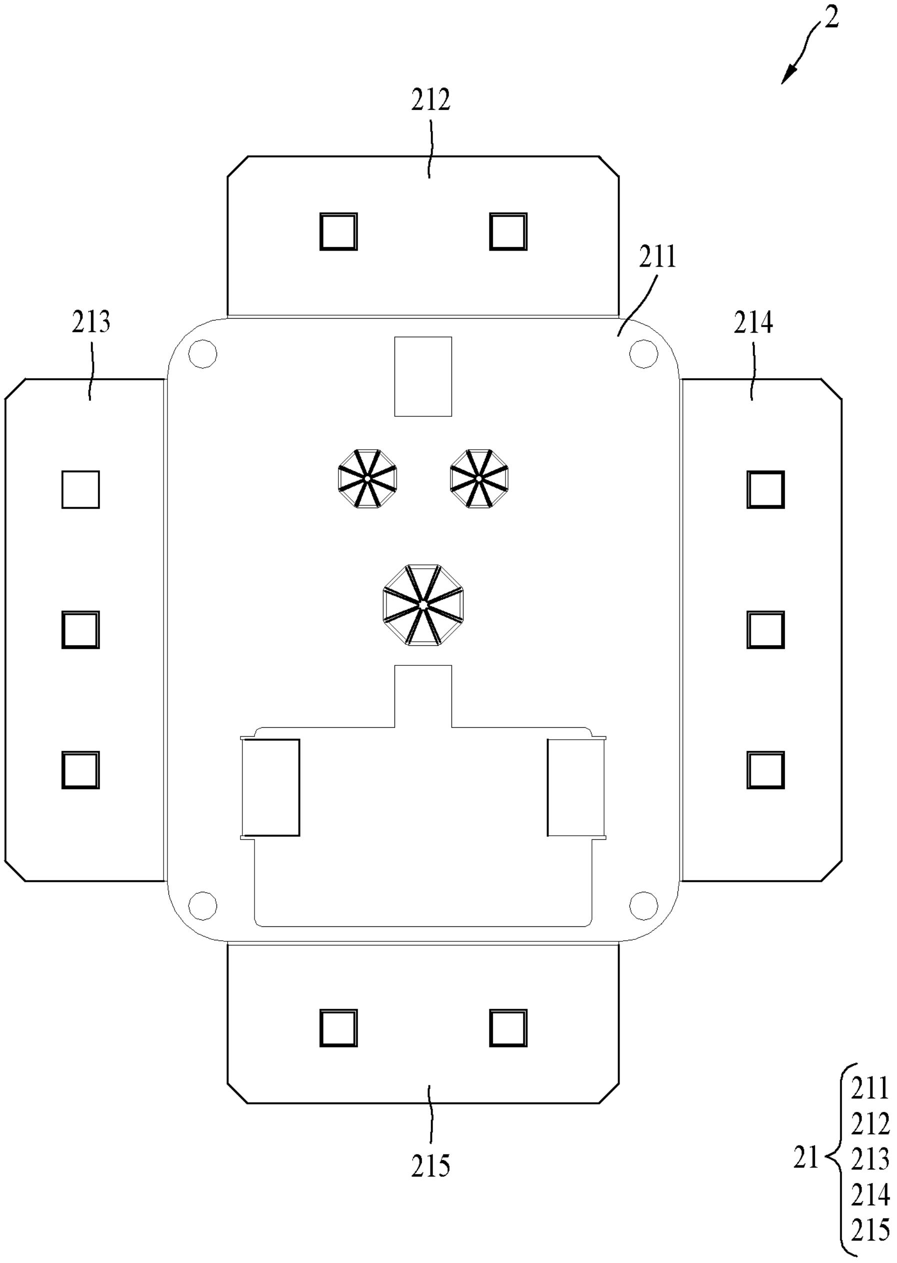
FIG. 11 is a plan view of a shield shell base yet to be completed according to an embodiment.

As shown in FIGS. 10 and 11, the shield shell base 2 may include a base frame 21, a base main hole 22, a base cable hole 23, and a base ground hole 24. The base frame 21 may form the exterior of the shield shell base 2. The base main hole 22 may be formed through the base frame 21 and may accommodate at least a portion of the shield shell body. The base cable hole 23 may be formed through the base frame 21 and may accommodate the first cable. The base ground hole 24 may be formed through the base frame 21 and may accommodate the ground cable. It should be noted that in this specification, the base frame may be referred to as the shield frame.

The base frame 21 may be manufactured by folding several portions of a plate and forming holes therein. For example, the base frame 21 may include a plurality of planar parts. The plurality of planar parts, as shown in FIG. 11, may include a first base part 211, and a second base part 212, a third base part 213, a fourth base part 214, and a fifth base part 215 that are connected to the first base part 211. Each of the second to fifth base parts 212, 213, 214, and 215 may be formed to be inclined with respect to the first base part 211.

The base frame 21 may include a plurality of base frame arms 21*a*, 21*b*, 21*c*, and 21*d*. The plurality of base frame arms 21*a*, 21*b*, 21*c*, and 21*d* may include the first base frame arm 21*a*, the second base frame arm 21*b*, a third base frame arm 21*c*, and the fourth base frame arm 21*d*, as shown in FIG. 10. The first base frame arm 21*a* may be formed on at least one of the second base part 212, the third base part 213, the fourth base part 214, and the fifth base part 215. For example, the first base frame arm 21*a* may extend inward from at least one of the second base part 212, the third base part 213, the fourth base part 214, and the fifth base part 215. The second base frame arm 21*b* may be provided on an edge portion of the base cable hole 23 and may be in contact with the first cable shield. The third base frame arm 21*c* may be provided on an edge portion of the base main hole 22 and may be in contact with the shield shell body. The fourth base frame arm 21*d* may be provided on an edge portion of the base ground hole 24 and may be in contact with the ground terminal. It should be noted that in this specification, the base frame arm may be referred to as a shield frame arm.

The first base frame arm 21*a* may be connected to an outer surface of the inner case (see FIG. 2). The second base frame arm 21*b* may extend from the base frame 21. The second base frame arm 21*b* may be connected to the first ferrule 51 (see FIG. 5). The third base frame arm 21*c* may extend from the base frame 21. The third base frame arm 21*c* may be in contact with a first body frame arm 31*a*, which will be described later. The fourth base frame arm 21*d* may be connected to the ground terminal 96 (see FIG. 8).

Figure 12:
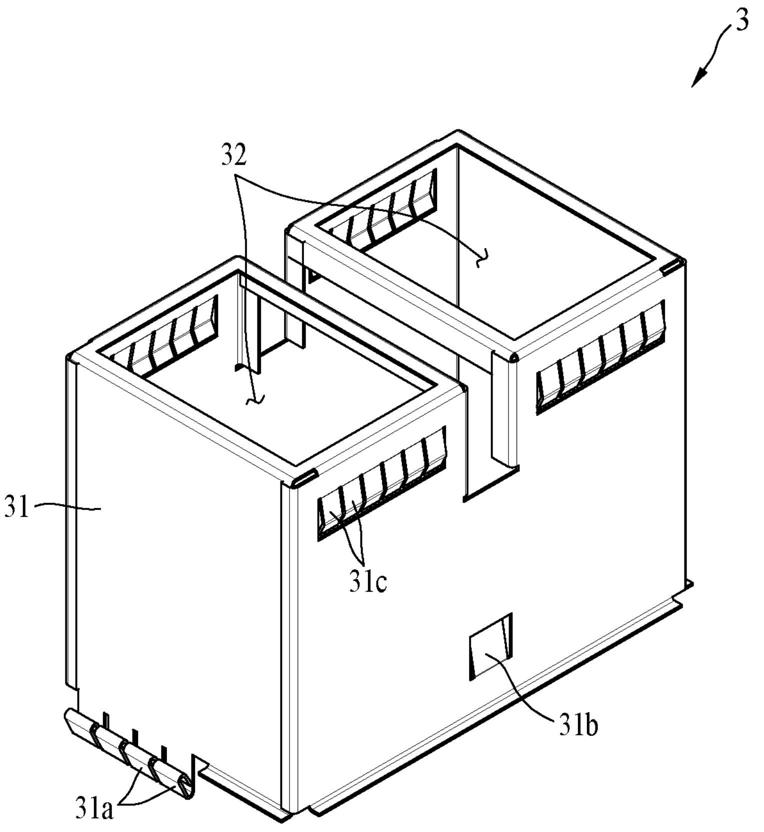
FIG. 12 is a perspective view of a shield shell body according to an embodiment.
Figure 13:
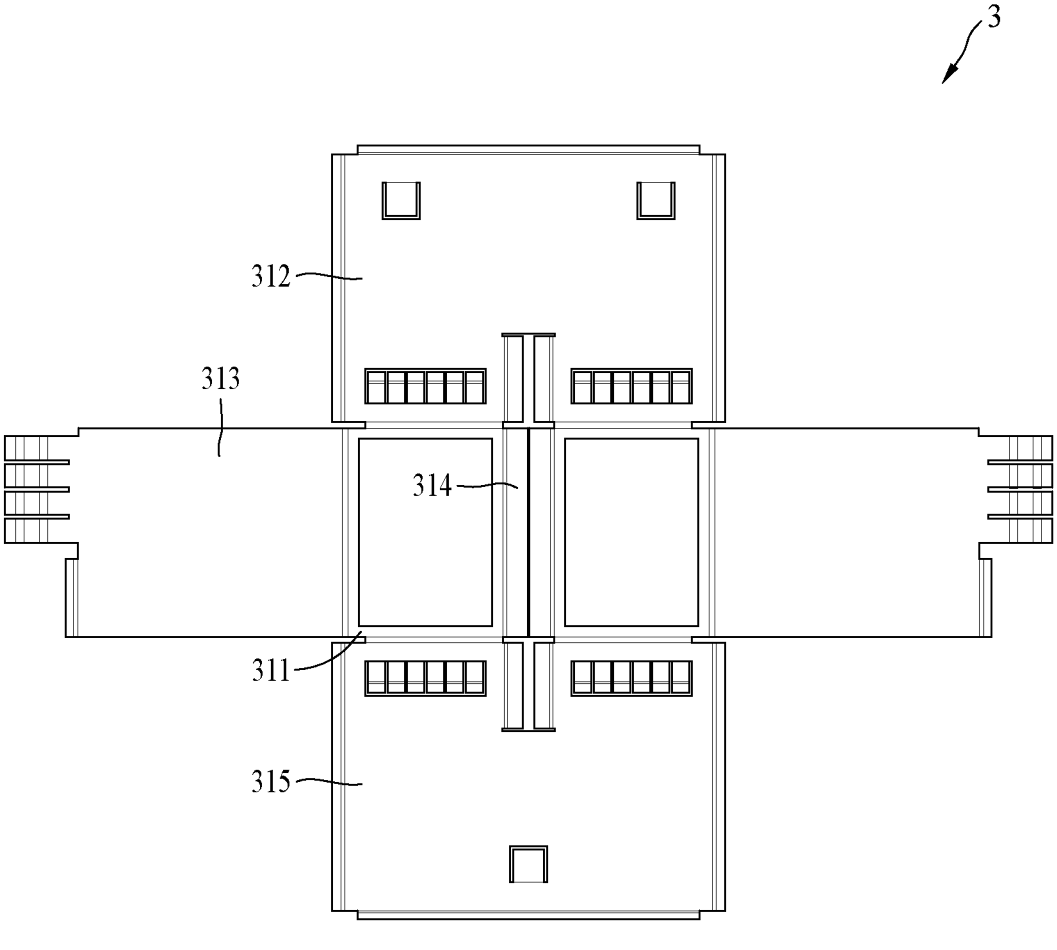
FIG. 13 is a plan view of a shield shell body yet to be completed according to an embodiment.

As shown in FIGS. 12 and 13, the shield shell body 3 may be manufactured by folding several portions of a plate and forming holes therein. For example, the shield shell body 3 may include a plurality of planar parts. The plurality of flat parts may include a first body part 311, and a second body part 312, a third body part 313, a fourth body part 314, and a fifth body part 315 that are connected to the first body part 311. Each of the second to fifth body parts 312, 313, 314, and 315 may be formed to be inclined with respect to the first body part 311.

The shield shell body 3 may include a body frame 31 and a body hole 32 formed on one side of the body frame 31, as shown in FIG. 12. The body hole 32 may accommodate the second cable. The body frame 31 may include a plurality of body frame arms 31*a*, 31*b*, and 31*c*. The plurality of body frame arms 31*a*, 31*b*, and 31*c* may include the first body frame arm 31*a*, a second body frame arm 31*b*, and the third body frame arm 31*c*. The first body frame arm 31*a* may be in contact with the shield shell base. The second body frame arm 31*b* may be in contact with the case groove 92*a* (see FIG. 2) provided in the inner case 92. The third body frame arm 31*c* may be in contact with the second ferrule. It should be noted that in this specification, the body frame may be referred to as a shield frame. It should be noted that in this specification, the body frame arm may be referred to as a shield frame arm.

Figure 14:
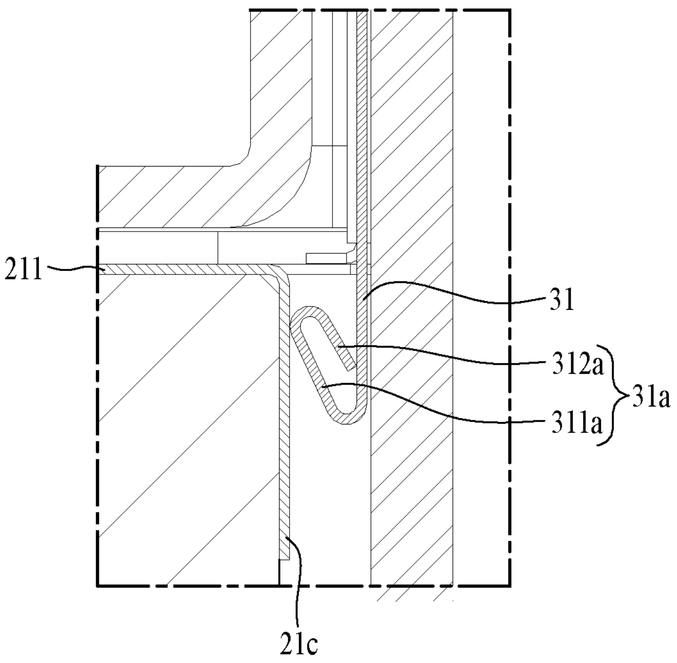
FIG. 14 is a cross-sectional view illustrating a third base frame arm and a first body frame arm being connected according to an embodiment.

As shown in FIG. 14, the third base frame arm 21*c* may extend from the first base part 211. The third base frame arm 21*c* and the first base part 211 may form an angle of approximately 90 degrees. The body frame 31 may include the first body frame arm 31*a* extending from a side portion thereof. The first body frame arm 31*a* may include a first arm part 311*a* bending outward from a side portion of the body frame 31 and extending, and a second arm part 312*a* bending back inward and extending.

According to an embodiment, the design of a connector may be simplified. The design and components of a charging inlet for shield configuration may be simplified. The manufacturing process of a connector may be optimized. The wiring components and processes for shield configuration may be simplified. In manufacturing a connector, productivity may improve, and quality may improve. Implementing an earth ground and a chassis ground through a direct fastening structure may improve shield performance. Manual wiring work related to shield configuration is reduced, and thus, quality risk may be reduced.

Embodiments have been described above with reference to specific matters such as specific components and limited embodiments and with reference to drawings, but these are provided to facilitate overall understanding. The present disclosure is not limited to the above-described embodiments, and various modifications and variations are possible from these descriptions by those skilled in the art to which the present disclosure pertains. Accordingly, the scope of the present disclosure is defined not by the detailed description, but by the claims and their equivalents, and all variations within the scope of the claims and their equivalents are to be construed as being included in the disclosure.

What is claimed is:

1. An electrical connector having a shield structure, the connector comprising:
- a housing;
- an outer case connected to the housing;
- an inner case disposed between the housing and the outer case;
- a shield structure surrounding at least a portion of the inner case;
- a first cable having a first line configured to transmit an alternating current, a first inner cover surrounding the first line, and a first cable shield surrounding the first inner cover and connected to the shield structure;

a second cable having a second line configured to transmit a direct current, a second inner cover surrounding the second line, and a second cable shield surrounding the second inner cover and connected to the shield structure;

a ground terminal connected to the housing, in contact with the shield structure, and electrically connecting the first cable shield and the second cable shield to a first ground;

a ground cable connected to the ground terminal and electrically connecting the first cable shield and the second cable shield to a second ground; and a first ferrule including a first inner ferrule connected to the first cable shield and a first outer ferrule surrounding the first inner ferrule and connected to the shield structure and the first cable shield, the first outer ferrule having:

a first outer ferrule base with an inner surface connected to the first cable shield;

a first outer ferrule head with an outer surface connected to the shield structure and an inner surface connected to the first inner cover; and a first outer ferrule body connecting the first outer ferrule base and the first outer ferrule head.

2. The electrical connector of claim 1, wherein the shield structure includes a shield shell base surrounding at least a portion of the inner case and a shield shell body connected to the shield shell base.

3. The electrical connector of claim 2, wherein the shield shell base has a base frame and a base frame arm extending from the base frame.

4. The electrical connector of claim 3, wherein the shield shell body has a body frame and a plurality of body frame arms extending from the body frame and connected to the base frame arm.

5. The electrical connector of claim 1, wherein the outer case has an outer case body connected to the housing.

6. The electrical connector of claim 5, wherein the outer case has:

a first cable accommodating part formed through the outer case body and accommodating the first cable;

a second cable accommodating part protruding from the outer case body and accommodating the second cable; and a ground terminal accommodating part formed through the outer case body and accommodating the ground terminal.

7. The electrical connector of claim 6, wherein a size of the second cable accommodating part is greater than a size of the first cable accommodating part.

8. The electrical connector of claim 6, wherein the first cable accommodating part and the second cable accommodating part are each provided in plurality.

9. The electrical connector of claim 6, wherein the ground terminal accommodating part is disposed between the first cable accommodating part and the second cable accommodating part.

10. The electrical connector of claim 1, wherein the shield structure includes a shield frame surrounding at least a portion of the inner case, and a shield frame arm extending from the shield frame and connected to the first ferrule.

11. The electrical connector of claim 1, wherein the first outer ferrule body has an inclined surface.

12. The electrical connector of claim 11, further comprising a second ferrule connecting the second cable shield and the shield structure.

13. The electrical connector of claim 12, wherein the shield structure has a shield frame surrounding at least a portion of the inner case, and a shield frame arm extending from the shield frame and connected to the second ferrule.

14. The electrical connector of claim 12, wherein the second ferrule includes a second inner ferrule connected to the second cable shield and a second outer ferrule surrounding the second inner ferrule and connected to the shield structure and the second cable shield.

15. The electrical connector of claim 14, wherein the second outer ferrule includes:

a second outer ferrule base with an inner surface connected to the second cable shield;

a second outer ferrule head with an inner surface connected to the shield structure; and a second outer ferrule body connecting the second outer ferrule base and the second outer ferrule head, the second outer ferrule body having an inclined surface.

16. The electrical connector of claim 1, wherein the first ground is an earth ground, and the second ground is a chassis ground.

17. An electrical connector having a shield structure, the electrical connector comprising:

a housing;

an outer case connected to the housing;

an inner case disposed between the housing and the outer case;

a shield structure surrounding at least a portion of the inner case;

a first cable having a first line configured to transmit an alternating current, a first inner cover surrounding the first line, and a first cable shield surrounding the first inner cover and connected to the shield structure;

a second cable having a second line configured to transmit a direct current, a second inner cover surrounding the second line, and a second cable shield surrounding the second inner cover and connected to the shield structure;

a ground terminal connected to the housing, in contact with the shield structure, and electrically connecting the first cable shield and the second cable shield to a first ground;

a ground cable connected to the ground terminal and electrically connecting the first cable shield and the second cable shield to a second ground; a first ferrule including a first inner ferrule connected to the first cable shield and a first outer ferrule surrounding the first inner ferrule and connected to the shield structure and the first cable shield, and a second ferrule connecting the second cable shield and the shield structure, the second ferrule includes a second inner ferrule connected to the second cable shield and a second outer ferrule surrounding the second inner ferrule and connected to the shield structure and the second cable shield, the second outer ferrule includes:

a second outer ferrule base with an inner surface connected to the second cable shield;

a second outer ferrule head with an inner surface connected to the shield structure; and a second outer ferrule body connecting the second outer ferrule base and the second outer ferrule head, the second outer ferrule body having an inclined surface.

18. An electrical connector having a shield structure, the connector comprising:

a housing;
an outer case connected to the housing;
an inner case disposed between the housing and the outer case;
a shield structure surrounding at least a portion of the inner case;
a ground terminal connected to the housing, in contact with the shield structure, and adapted to electrically connect a first cable shield of a first cable and a second cable shield of a second cable to a first ground; and
a first ferrule including a first inner ferrule adapted to be connected to the first cable shield of the first cable and a first outer ferrule surrounding the first inner ferrule and connected to the shield structure, the first outer ferrule includes a first outer ferrule base with an inner surface adapted to be connected to the first cable shield.

19. The electrical connector of claim 18, wherein the first outer ferrule further includes a first outer ferrule head with an outer surface connected to the shield structure and an inner surface adapted to be connected to a first inner cover of the first cable.

20. The electrical connector of claim 19, wherein the first outer ferrule further includes a first outer ferrule body connecting the first outer ferrule base and the first outer ferrule head.

* * * * *